Sept. 3, 1940.  J. P. JEFFCOCK  2,213,863
CATHODE-RAY-TYPE DIRECTION FINDER
Filed Nov. 26, 1937
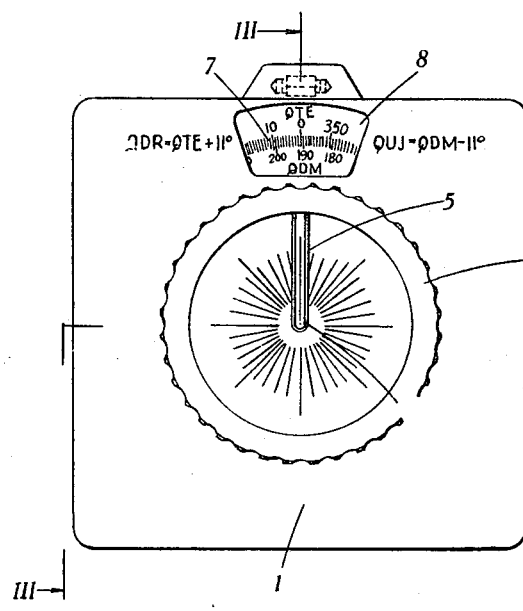
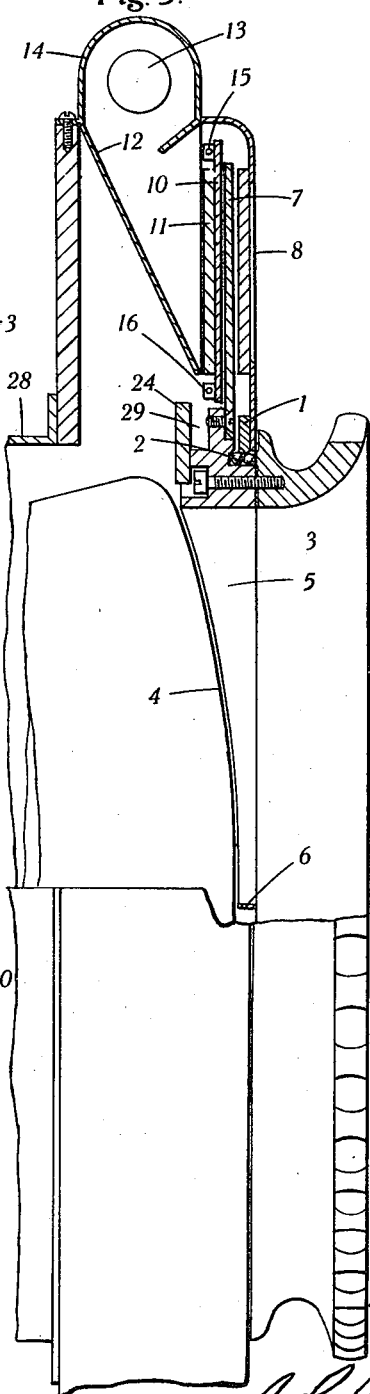
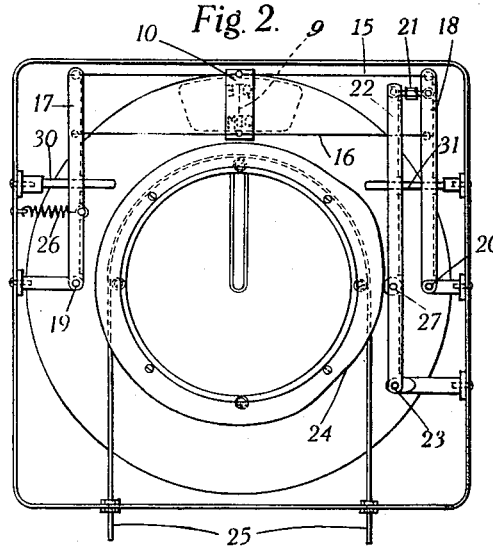
INVENTOR
J. P. Jeffcock Patented Sept. 3, 1940

2,213,863

UNITED STATES PATENT OFFICE 2,213,863

CATHODE-RAY-TYPE DIRECTION FINDER

John Parkyn Jeffcock, Surbiton, England

Application November 26, 1937, Serial No. 176,487
In Great Britain November 26, 1936

5 Claims. (Cl. 250—11)

This invention relates to cathode-ray-type direction finders, and is particularly applicable to aeronautical cathode-ray-type direction finders.

Apparatus has been used, in which the direction of a radio transmitter is indicated by means of a radial line on the screen of a cathode-ray tube, thus eliminating the goniometer and "sensing" device used in earlier types of direction finders, and reducing the duration of transmission required for satisfactory bearings; the resulting increase in speed of operation, is particularly advantageous in the case of aeronautical direction-finding stations which may be required to determine the bearing of an aircraft several times per minute, while it is flying at high speed in the vicinity of the station.

With cathode-ray direction finders as hitherto used a scale has been arranged surrounding or marked upon the end of the cathode-ray tube, and calibrated in degrees. As soon as a flash occurs on the fluorescent screen of the tube, the operator observes the reading corresponding to the line of the flash. This operation involves considerable skill on the part of the operator, and moreover, it is not possible to check up the reading after the flash is extinguished.

Furthermore, with such known cathode-ray direction finders, it has been necessary to correct for the constant errors associated with the site, by making a calculation or referring to a chart showing the actual bearing or reciprocal corresponding to any scale reading. This procedure has reduced the effective speed of operation and has increased the likelihood of operational errors being introduced.

The present invention has for its object to simplify the reading of cathode-ray direction finders and to avoid operational errors, and to this end a single unit (referred to hereinafter as a "Gonioscope") is provided in which a scale and a rotatable cursor are associated with a cathode-ray tube, whereby the magnitude of bearings and reciprocals can be determined directly, before or after the cessation of the transmission, the direction of which it is required to determine.

Another object of the invention is to provide automatic compensation for site error, whereby corrected bearings and reciprocals may be determined directly from the evenly divided scale of the gonioscope.

Another object of the invention is to provide an arrangement which enables the operator of the gonioscope to focus his attention upon the same small area of the instrument while reading the magnitude of any bearing or reciprocal.

Another object of the invention is to provide an arrangement whereby the scale readings always decrease from left to right, or vice versa, as viewed from the operating position.

Another object of the invention is to provide an arrangement whereby the true or magnetic bearings or reciprocals, are identified by appropriate designations which appear in the correct orientation immediately above or below the required scale reading.

In order that the invention may be more clearly understood, reference will now be made to the accompanying drawing, which shows by way of example one embodiment thereof, and in which Fig. 1 shows a front view of the gonioscope.

Fig. 2 shows a rear view of the cover of the gonioscope.

Fig. 3 shows, on an enlarged scale, a view looking along the line III—III of Fig. 1.

In the construction shown in the drawing, the top cover 1 of the gonioscope is provided with a circular opening, the edge of which forms the outer race of a ball bearing 2 which supports a freely rotatable annular member 3, having a forward projecting flange forming a hand wheel for convenient operation.

The screen 4 of a cathode-ray tube is exposed to view through the circular opening in the hand-wheel, behind which it is symmetrically located. A U shaped cursor 5 is attached by its extremities to the inner periphery of the hand-wheel, so that the semi-circular part 6 at the opposite end is co-axial with the hand-wheel: thus the cursor may be rotated about the centre of the fluorescent screen, and to avoid parallax, the inner edges of the cursor are so shaped that they are very close to the screen at all points (see Fig. 3).

Inside the gonioscope, the outer periphery of the hand-wheel carries a transparent annular dial 7 on which two concentric scales are marked: the scales are divided into degrees and the outer diameter of the inner scale is co-incident with the inner diameter of the outer scale: the markings of the inner scale are displaced from the equivalent markings of the outer scale by 180 degrees plus the appropriate magnetic variation, which is about 11 degrees.

The gonioscope is preferably located so that its hand-wheel faces the operator in a sloping or vertical plane, the top portion of the dial being visible through a transparent window 8 in the cover 1 of the unit; a central indicator 9 in the form of a radial line, is marked on the transparent member 10 which is arranged immediately behind the exposed part of the dial, and in conjunction with the outer and inner scales, it indicates true bearings and magnetic reciprocals respectively. In aeronautical radio communication, true bearings and magnetic reciprocals are commonly denoted by the code groups QTE and QDM respectively, and these abbreviations appear at the outer and inner extremities of the indicating line respectively, QTE and the outer scale being marked in black and QDM and the inner scale being marked in red. Additional scales could also be marked on the dial to show the corresponding values of magnetic bearings and true reciprocals, but this information is at present required so infrequently from aeronautical ground stations, that the complication of two additional scales would not be justified; however, to facilitate calculation, the appropriate code groups are marked on the top cover of the gonioscope at each side of the scale window; thus, on the left QDR=QTE+11° is marked in black, and on the right QUJ=QDM—11° is marked in red, assuming 11° to be the magnetic variation at the site in question.

A white translucent background 11 is provided behind the exposed part of the scale 7, and is illuminated from behind, by means of a reflector 12 and a lamp 13 which is located in a detachable housing 14 and can be replaced without removing the cover 1 of the gonioscope.

The indicator line with its associated markings QTE and QDM is marked on a strip of transparent material 10 located between the scale and its background and arranged to be rotatable about the axis of the dial through a small angle on either side of its mean position shown in Figs. 1 and 2, in order to compensate for site errors with the cursor in any position. The line is arranged to move, by attaching the ends of the transparent indicator strip 10 to supporting wires 15 and 16 stretched in a plane parallel to the top of the gonioscope, and having a mean direction at right angles to the indicator line: the two wires are stretched between a tension arm 17 and a control arm 18 which in their mean positions are at right angles to the wires, and are both hinged at points 19, 20 on an imaginary line which passes through the axis of the dial in a direction parallel to the wires. The tension arm 17 is held by the spring 26 so that it tends to move outwards in the direction of the adjacent side of the gonioscope, and the control arm 18 is attached by a rigid link 21 of adjustable length to the free end of a cam lever 22 which is hinged at a point 23 on the opposite side of an imaginary line passing through the hinges 19, 20 of the two arms, with which the cam lever is parallel in its mean position. A cam roller 27 attached to the cam lever 22 engages radially (in its mean position) with the periphery of a cam face 24 of approximately circular form, which is mounted co-axially on the hand-wheel assembly: thus the force exerted by the tension arm 17 is transmitted through the supporting wires 15, 16 the control arm 18 and the cam lever 22, to the cam roller 27 which is consequently pressed against the cam face 24. The position, amplitude and sign of the cam undulations, are arranged to compensate for the constant errors associated with the direction-finding site; thus, in the absence of errors the cam would be circular, and upon rotating the cursor the indicator line would not be advanced or retarded relative to its mean position. A new cam may be readily substituted when required, and the adjustable link 21 between the cam lever and the control arm allows the mean position of the indicator line to be set accurately. Guide members 30, 31 may be provided passing through apertures in the members 17, 18 and 22 in order to restrain the movement of these members to a predetermined plane.

Since the hand-wheel assembly and the error correction mechanism are wholly mounted on the top cover of the gonioscope, this may be removed easily for maintenance. The cathode-ray tube may be enclosed by the casing 28.

The cursor may be controlled from a remote point by means of an endless belt 25 running in a suitable groove 29 adjacent to the cam plate, and controlled by means (not shown) such as a pulley and associated operating knob located in any convenient position. The remote control is obviously optional and, when used, the hand wheel 3 may be omitted.

It will be understood that various modifications may be made without departing from the scope of the invention as defined by the appended claims. For example, instead of providing the cam and associated mechanism for compensating for site errors, the scale itself may be calibrated in uneven divisions to compensate for this. Further, instead of moving the index mark to compensate for site errors, the scale may be coupled to the handwheel in such a way that there is relative compensating motion between these two members. The compensation could also be effected electrically instead of mechanically.

I claim:

1. A cathode-ray-type direction finder comprising a cathode-ray tube, an annular member rotatably arranged so that the end of said tube is visible through the opening in said annular member and a cursor fixed to said annular member and extending radially inwards over the face of said tube substantially to the axis thereof so as to be rotatable substantially about the axis of said tube.

2. A direction finder as claimed in claim 1, wherein the rotatable annular member comprises a hand wheel.

3. A direction finder as claimed in claim 1 wherein an index is provided and the annular member carries an annular scale which cooperates with said index.

4. A cathode-ray direction finder indicator, comprising a cathode ray tube having a screen and an indicating cathode ray beam, a cursor rotatably mounted over the cathode ray screen, means for rotating said cursor over said screen to mark the position of indication of said tube, a rotatable scale, a fixed index operatively associated with said scale to give scale indication by relative movement of said scale and means responsive to rotary movement of said cursor for producing further relative movement between said scale and said index.

5. A direction finder as claimed in claim 4, wherein said last named means comprises a cam coupled with said cursor which cam coacts to move the index in accordance with the position of the cursor to compensate for site errors.

JOHN PARKYN JEFFCOCK.